United States Patent Office 2,865,964
Patented Dec. 23, 1958

2,865,964
POLY(TRIPHENYLPHOSPHONIUM) COMPOUNDS

Clinton A. Dornfeld, Glenview, and Lawrence E. Thielen, Chicago, Ill., assignors to G. D. Searle & Co., Chicago, Ill., a corporation of Illinois No Drawing. Application September 23, 1955
Serial No. 536,279

7 Claims. (Cl. 260—606.5)

This invention relates to polyphosphonium compounds and processes for the manufacture thereof. More particularly, this invention relates to compounds of the formula

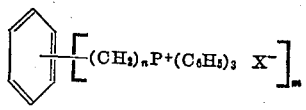

wherein X is bromine or chlorine, n is 0 or the positive integer 1, and m is a positive integer greater than 2 and less than 5. When n is 0, it will be apparent that the foregoing formula reduces to

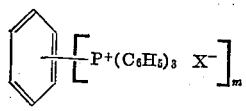

wherein X and m are defined as before.

The subject compounds are useful because of their valuable pharmacological properties. Thus, for example, the claimed compositions manifest a capacity for blocking the transmission of nerve impulses across the autonomic ganglia without at the same time effecting the marked hypotension characteristic of other phosphonium compounds known in the art.

The compounds of the present discovery are soluble in water, as also in aqueous solutions of alcohols and other water-miscible organic solvents. They may be administered in solid form as tablets or capsules; dissolved in aqueous media, they may be given parenterally.

A preferred means of access to the bromo compounds of this invention is as follows: An appropriate polybromide—that is, one having the formula

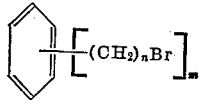

wherein n and m have the meanings hereinbefore assigned—is caused to react with triphenylphosphine at temperatures between 125 and 200° centigrade for periods of time ranging from 30 minutes to as long as 24 hours. The reaction is ordinarily carried out in a non-aqueous, inert, polar solvent, desirably an oxygenated material such as pentane-2,4-dione, dimethylformamide, or one of the glycol ethers such as diethylene glycol diethyl ether. A sealed system is maintained where the solvent used has a boiling point appreciably lower than the temperature at which the reaction is run. The phosphonium chlorides of this invention are derived by treating the corresponding bromides with silver chloride—for example, in aqueous medium at reflux temperatures over a 2-hour period.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

EXAMPLE 1

*Benzene-1,2,4,5-tetrakis(triphenylphosphonium bromide)*

A mixture of 100 parts of triphenylphosphine, 38 parts of 1,2,4,5-tetrabromobenzene, and 136 parts of diethylene glycol diethyl ether is heated at reflux temperatures for 16 hours under an atmosphere of nitrogen. A dark-colored solid cakes out in process. The cooled reaction product, including a clear, supernatant, liquid layer, is intimately mixed with anhydrous ether, producing a white flocculent precipitate which is extracted into water. The aqueous extract is washed with additional ether, following which the water is removed at approximately 90° C. in vacuo. The residue is dissolved in anhydrous alcohol and treated therein with decolorizing charcoal. Following filtration, solvent is removed by evaporation at 90° C. in a stream of nitrogen. The residue thus obtained is washed several times by trituration with acetone to yield a pale, off-white powder which is benzene-1,2,4,5-tetrakis(phosphonium bromide), having the formula

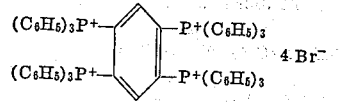

Samples of material prepared by the foregoing procedure analyzed 22.26% bromine and 8.30% phosphorus.

EXAMPLE 2

*Benzene-1,2,4-tris(triphenylphosphonium bromide)*

Using the technique of Example 1, 20 parts of triphenylphosphine, 6 parts of 1,2,4-tribromobenzene, and 27 parts of diethylene glycol diethyl ether are reacted together at reflux temperatures for 16 hours under nitrogen to give benzene-1,2,4-tris(triphenylphosphonium bromide). The product is worked up by succesive precipitation with ether, extraction into water, evaporation, decolorization in alcohol solution, and stripping of solvent. Benzene-1,2,4-tris(triphenylphosphonium bromide) has the formula

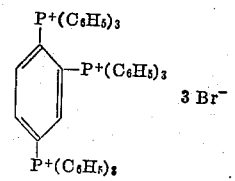

EXAMPLE 3

(A) $\alpha^1,\alpha^4$-*Dibromodurene*

A mixture of 205 parts of $\alpha^1,\alpha^4$-dichlorodurene, 600 parts of sodium acetate, and 2000 parts of glacial acetic acid is heated at reflux temperatures with agitation, following which—maintaining temperature and agitation—anhydrous hydrogen bromide is introduced in an amount slightly greater than that required to saturate the reaction mixture. The reactants are allowed to cool to room temperatures over-night. The mixture is then poured into about 10 volumes of water, precipitating $\alpha^1,\alpha^4$-dibromodurene as a solid which, crystallized from ether, melts at approximately 160–160.5° C.

(B) $\alpha^1,\alpha^2,\alpha^4,\alpha^5$-*Tetrabromodurene*

A mixture of 10 parts of the dibromo compound of the preceding Part A, 13 parts of N-bromosuccinimide, 1 part of benzoyl peroxide, and 480 parts of anhydrous chloroform is agitated for 30 minutes at reflux temperatures while being irradiated with high-intensity visible light. (G. E. Photoflood RPS 2 serves as a suitable light source.) The reaction is exothermic, but exogenous heating is required to maintain operating temperatures after the first 10 minutes. The reaction mixture is filtered hot, and the filtrate is stripped of solvent by vacuum distillation. The residue, upon successive crystallizations from ether and from acetone, melts at 158–160° C. The product thus obtained is $\alpha^1,\alpha^2,\alpha^4,\alpha^5$-tetrabromodurene.

(C) *Durene-$\alpha^1,\alpha^2,\alpha^4,\alpha^5$-tetrakis(triphenyl-phosphonium bromide)*

A mixture of 5 parts of $\alpha^1,\alpha^2,\alpha^4,\alpha^5$-tetrabromodurene, 12 parts of triphenylphosphine, and 39 parts of 2,4-pentanedione is maintained at the boiling point for 1 hour under an atmosphere of nitrogen. The reaction mixture, including a precipitate which cakes out in process, is washed 3 times by extraction with 200-part quantities of anhydrous ether, solid matter being triturated to facilitate the washing operation. Insoluble solids are then recovered by filtration, taken into anhydrous alcohol, and treated therein with decolorizing charcoal. The bulk of the alcohol is boiled off, following which precipitation is effected by addition of acetone. The precipitate thus obtained is filtered off, washed on the filter with acetone, and finally dried in vacuo. The white powder which results is durene-$\alpha^1,\alpha^2,\alpha^4,\alpha^5$-tetrakis(triphenylphosphonium bromide), the melting point of which is above 300° C. The product has the formula

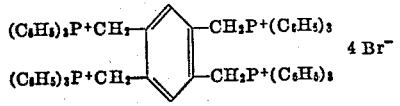

Samples of material prepared by the foregoing procedure analyzed 20.98% bromine and 8.50% phosphorus.

EXAMPLE 4

*Pseudocumene-$\alpha^1,\alpha^2,\alpha^4$-tris(triphenylphosphonium bromide)*

A mixture of 19 parts of $\alpha^1,\alpha^2,\alpha^4$-tribromopseudocumene, 42 parts of triphenylphosphine, and approximately 195 parts of 2,4-pentanedione is heated for 1 hour at reflux temperatures under nitrogen. On cooling, the reaction mixture sets to a solid. The reaction product is washed by successive triturations with anhydrous ether and with acetone (twice). A pale cream-colored powder results, which is dissolved in anhydrous alcohol and treated with decolorizing charcoal therein. After filtering, alcohol is removed by evaporation under nitrogen, following which the residue is again washed by trituration with acetone. The white powder thus obtained is pure pseudocumene - $\alpha^1,\alpha^2,\alpha^4$ - tris(triphenylphosphonium bromide) which melts at approximately 228° C. (with decomposition) and has the formula

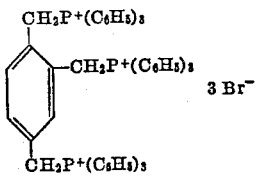

EXAMPLE 5

*Mesitylene-$\alpha^1,\alpha^3,\alpha^5$-tris(triphenylphosphonium bromide)*

A mixture of 7 parts of triphenylphosphine, 3 parts of $\alpha^1,\alpha^3,\alpha^5$-tribromomesitylene, and approximately 20 parts of 2,4-pentanedione is refluxed for 1 hour under an atmosphere of nitrogen. The yellowing white solid precipitated in the dark-green reaction mixture is recovered on a funnel, washed thereon with anhydrous ether, and then dissolved in anhydrous alcohol at the boiling point. The alcohol solution is treated with decolorizing charcoal and filtered hot. From the filtrate, on cooling, there precipitates a white solid which, washed with anhydrous ether and dried, melts at approximately 280° C. (with decomposition). The product is mesitylene-$\alpha^1,\alpha^3,\alpha^5$-tris(triphenylphosphonium bromide), having the formula

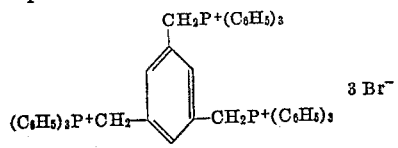

EXAMPLE 6

*Mesitylene-$\alpha^1,\alpha^3,\alpha^5$-tris(triphenylphosphonium chloride)*

A solution of 32 parts of the trisbromo compound of the preceding Example 5 in 3000 parts of water is thoroughly mixed with 12 parts of silver chloride during 2 hours at the boiling point. The product which results is mesitylene-$\alpha^1,\alpha^3,\alpha^5$-tris(triphenylphosphonium chloride), of the formula

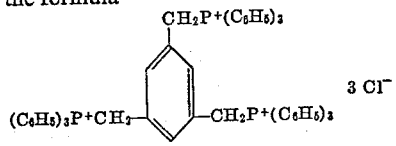

What is claimed is:
1. A compound selected from the group consisting of compounds of the formula

and compounds of the formula

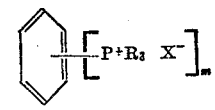

R in each formula being a phenyl radical, X being halogen of atomic number greater than 9 and less than 53, and *m* being a positive integer greater than 2 and less than 5.

2. A compound of the formula

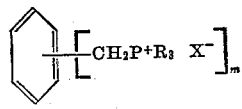

wherein R is a phenyl radical, X is halogen of atomic number greater than 9 and less than 53, and *m* is an integer greater than 2 and less than 5.

3. Mesitylene - $\alpha^1,\alpha^3,\alpha^5$ - tris(triphenylphophonium bromide).

4. Pseudocumene - $\alpha^1,\alpha^2,\alpha^4$ - tris(triphenylphosphonium bromide).

5. Durene - $\alpha^1,\alpha^2,\alpha^4,\alpha^5$ - tetrakis(triphenylphosphonium bromide).

6. A compound of the formula

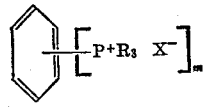

wherein R is a phenyl radical, X is halogen of atomic number greater than 9 and less than 53, and *m* is an integer greater than 2 and less than 5.

7. Benzene-1,2,4,5-tetrakis(triphenylphosphonium bromide).

References Cited in the file of this patent

UNITED STATES PATENTS 1,921,364     Lommel et al. _____ Aug. 8, 1933

OTHER REFERENCES

Ginzel et al.: Chem. Abs., 47, col. 4496 (c–f).
Ginzel et al.: Chem. Abs., 48, col. 8951 (e–h). (Copy Office Library.)